Figure 7:
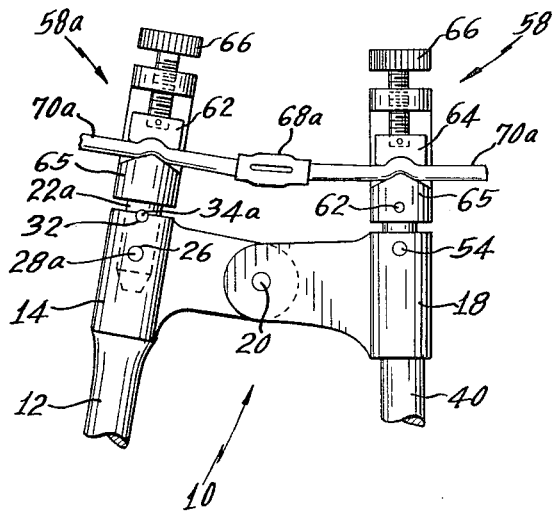

Sept. 13, 1966 W. H. DICKMAN 3,272,002
TESTING TOOLS
Filed Dec. 31, 1963 2 Sheets-Sheet 1
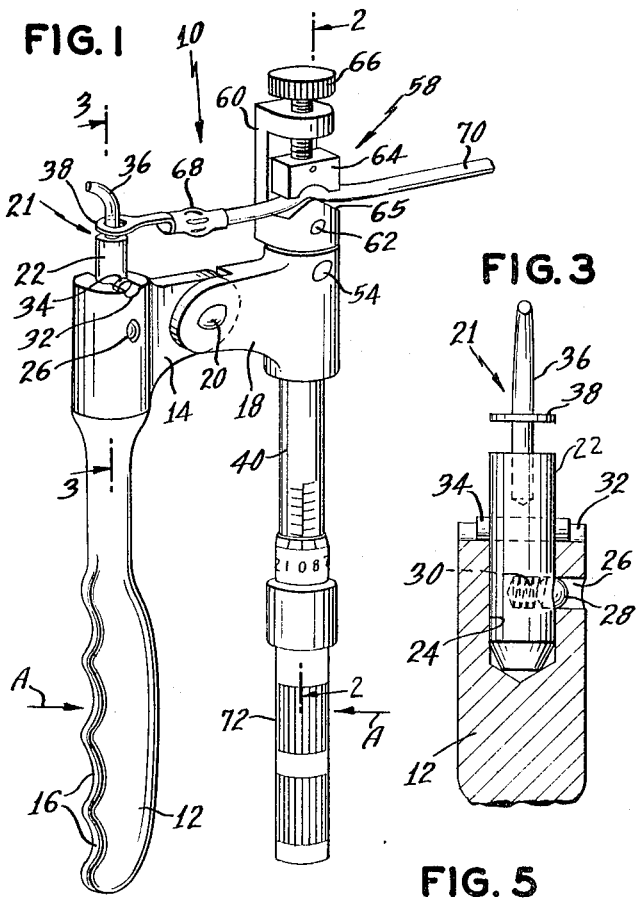
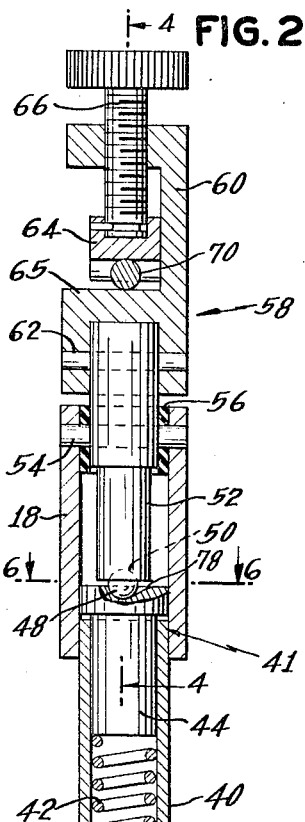
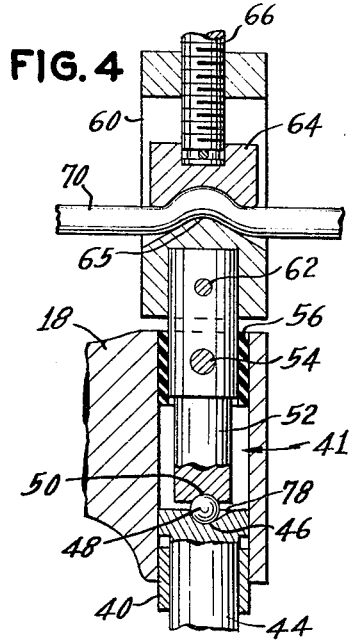
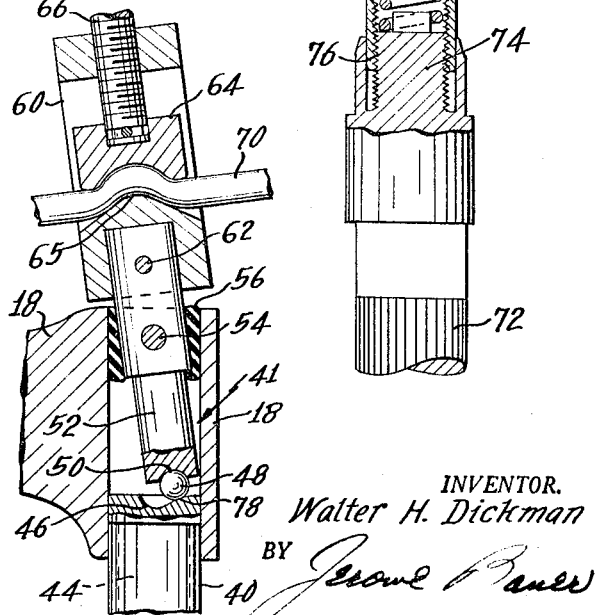
INVENTOR.
Walter H. Dickman
BY
ATTORNEY Sept. 13, 1966

W. H. DICKMAN 3,272,002

TESTING TOOLS

Filed Dec. 31, 1963

2 Sheets-Sheet 2

INVENTOR.
Walter H. Dickman
BY
Jerome Bauer
ATTORNEY

United States Patent Office 3,272,002
Patented Sept. 13, 1966

3,272,002
TESTING TOOLS
Walter H. Dickman, 6 Darby Drive,
Huntington Station, N.Y.
Filed Dec. 31, 1963, Ser. No. 334,729
9 Claims. (Cl. 73—88)

This invention relates to testing tools and, more particularly, to tools for applying a force to a workpiece to test whether the same or parts thereof, are capable of withstanding specific predetermined forces.

In modern technology where stress is placed on quality control, it is important that even the most insignificant part of an overall assembly be capable of performing the functions required of it. To this end, tools must be provided to test such workpieces in an effort to determine whether they can withstand predetermined stresses or forces to which they may later be subjected. Tools of general application for pull testing of wires, rods, tapes, ropes, cords and appurtenant connectors are exemplified by the United States patent to Knight, 2,782,635. In the past, such tools have been used to test the capacity of a workpiece to withstand the application of forces. During such tests, it was common to utilize a calibrated indicator to be constantly observed by the testing operator. The use of such structures required the operator to exercise extreme care in applying the test forces. Hence, the test had to be performed slowly and gradually while the operator was required to give his full attention to the calibrated indicator to be sure to observe that no more than the desired force was being applied to the workpiece. All too frequently, the human error of the operator crept into the test and, consequently, the care and attention required of him was not fully given. As a result, many test workpieces were ruined by the operator by subjecting the workpiece to too great a test force.

It is an object and purpose of this invention to provide a testing tool that eliminates the problems inherent in prior tools of this type, that eliminates the necessity of an operator's constant attention to the tool during the performance of the test, that does not require an operator who has any specific mechanical skill and, in fact, a tool that is capable of being utilized by the unskilled, the sightless or other handicapped persons.

Another object of the invention is to provide a testing tool that can be operated to apply only a predetermined testing force to the workpiece and to release the application of forces to the workpiece when the predetermined force is exceeded. In this regard, another object of the invention is to provide a testing tool that is capable of being adjusted to apply different desired predetermined forces to different workpieces to be tested.

Accordingly, a feature and still another object of the invention resides in the details of construction by which the operator may preset the tool to the test force to be applied to the workpiece. When the testing force applied to the workpieces attains that for which the tool is preset, the tool automatically releases all forces applied to the workpiece at the same time emitting an audible sound and an indication perceptible to the tactile senses. Such functions serves to inform the operator by sight, sound and feel that the workpiece has passed the applied test force.

A further object of the invention is to provide a test tool capable of subjecting a workpiece to a pure "go" and "no-go" test, and wherein, when the workpiece passes the "go" test, the tool releases all of the applied forces and provides an indication perceptible to auditory and tactile senses.

Figure 8:
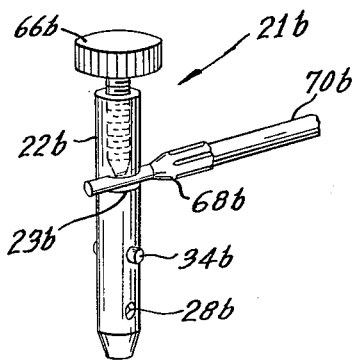
Figure 6:
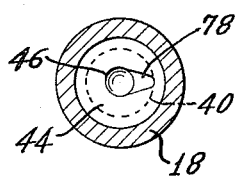
Figure 9:
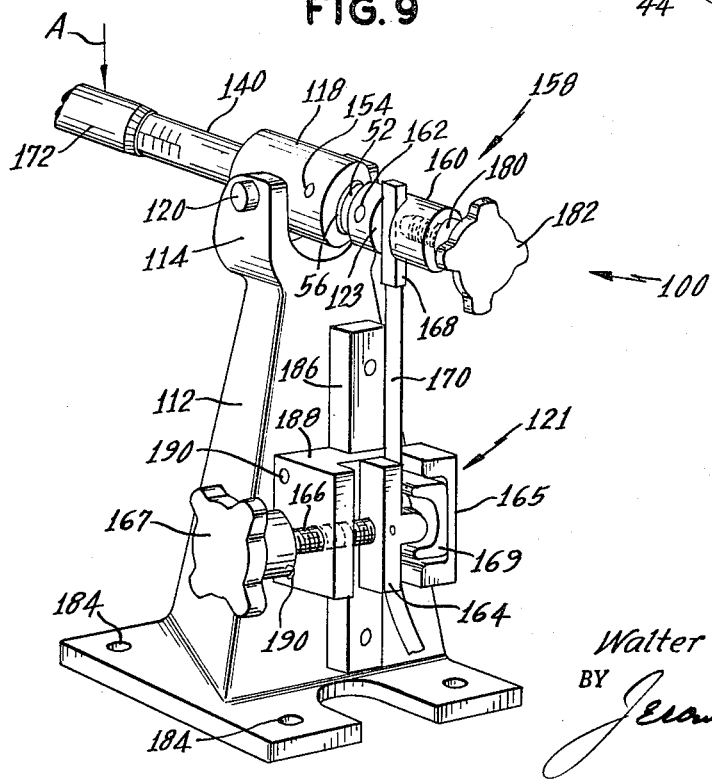

Other and further objects of this invention reside in the structures and arrangements hereinafter more fully described with reference to the accompanying drawings in which:

FIG. 1 is a perspective view of a plier-type testing tool constructed according to the teaching of the invention, FIG. 2 is a partial cross section of FIG. 1 taken along lines 2—2 and showing the parts in operative condition, FIG. 3 is a partial cross section of FIG. 1 taken along lines 3—3, FIG. 4 is a partial cross section of FIG. 2 taken along lines 4—4, FIG. 5 is a view similar to FIG. 4 showing the parts thereof in their inoperative released condition, FIG. 6 is a cross section of FIG. 2 taken along lines 6—6, FIG. 7 is a side view of a modification of the embodiment of FIG. 1, FIG. 8 is a perspective view of another form of a workpiece engaging structure, and FIG. 9 is a perspective view of a modified embodiment illustrating a bench type testing tool.

Referring now to the drawings, the testing tool shown in FIGS. 1 to 6 inclusive is of the plier-type and is generally identified by the numeral 10. The tool comprises a finger grip 12 having a laterally extending pivot arm 14. The finger grip 12 is provided with a plurality of finger grip depressions 16. Connected with the laterally extending pivot arm 14 is a similarly constructed but oppositely disposed pivot arm 18. The arms 14 and 18 are connected together for relative pivotal movement about the pin 20.

The upper portion of the finger grip 12 is hollowed as shown in FIG. 3 to accommodate the body 22 of a workpiece engaging means or structure 21. The body 22 is adapted to be inserted into and removed from the downwardly directed opening 24. The body 12 is also provided with an aperture 26 that is adapted to receive and cooperatively retain a ball detent 28 that is constantly urged into a projecting engaging position beyond the surface of the body 22 by a spring 30.

The upper surface of the finger grip 12 has a diametrically disposed groove 32 into which a pin 34, passing diametrically through the body 22 of the workpiece engaging means 21, is adapted to seat. Thus, when the ball detent 28 is engaged in the aperture 26, the workpiece engaging structure 21 is prevented from being accidentally removed from the opening 24. The pin 34, engaging in the groove 32, prevents the accidental rotation of the workpiece engaging structure 21 in the finger grip. However, the workpiece engaging means 21 may be removed from the opening 24 by a light lifting pressure applied thereto sufficient to overcome the engagement between the ball detent 28 and the aperture 26. The workpiece engaging structure 21 also includes an upwardly directed finger 36 that is bent at its end away from the body 22. Mounted on the finger 36 is a seat 38 against which the workpiece is adapted to rest.

The oppositely disposed laterally extending pivot arm 18 is hollow to accommodate a hand grip 40 that includes a force transmitting and releasing structure generally identified by the numeral 41. The structure 41 comprises a spring 42 mounted in the hand grip 40 that bears at its upper end against a plunger 44 slidable in the top of the hand grip 40. The plunger 44 is contoured as shown at 46 in FIGS. 4, 5 and 6 to seat and retain a lever in the form of a sphere or ball 48. The upper part of the lever 48 is pressed into engagement with a positive engaging seat 50 defined in the lower end of a hinge element 52 by the force of the spring 42.

The hinge element 52 is hingedly moved about a pivot pin 54 that secures the same for hinging movement relative to the interior of the pivot arm 18. The hinge element 52 is encased in or surrounded by a rubber ferrule 56 in the area of the pivot pin 54. The hinge element 52 extends beyond the top of the pivot arm 18 and into a workpiece engaging structure generally identified by the numeral 58.

The workpiece engaging structure 58 comprises a body member 60 that is adapted to receive the upper end of the hinge element 52 therein and is connected to the same to form an integral working and moving part thereof by a pin connection 62. The workpiece engaging structure 58 functions in the manner of a vise and includes a pair of relatively movable workpiece engaging vise elements 64 and 65. The element 64 is fixed to an adjustable screw 66 which is threaded in the body member 60 to move the element 64 toward and away from its mating engaging element 65 in order to engage a workpiece therebetween.

FIG. 1 illustrates the manner of operation of the testing tool 10 for testing the tensile strength and force resisting capabilities of a workpiece such as the connector element 68 affixed as a part of a wire or cable workpiece 70. In order to test the force resistance or capability of the workpiece 68–70, the eyelet of the connector 18 is slipped over the upper end of the bent finger 36 and downward therealong until it rests on top of the seat 38. The seat 38 is located on the finger 36 so as to be in substantial linear alignment with the facing side of the vise element 65 on the workpiece engaging structure 58. The adjustable screw 66 is rotated to cause the vise elements 65 and 64 to positively engage the workpiece part 70. This linear relationship of the workpiece engaging structures 21 and 58 assures that all forces applied to the workpiece 68–70 will be in a linear direction along the effective test length of the workpiece and exterted in opposite directions at their spaced points of engagement with the workpiece.

Before testing each workpiece, the operator is given a specified tensile force or value which he knows the workpiece must be capable of withstanding during use. In order to test the workpiece 68–70, the same, therefore, must be capable of withstanding the specified or predetermined tensile force to which it later may become subjected. If the workpiece can withstand or "go" the test force applied to it, there is no need to apply an additional force to the workpiece in excess of the predetermined test force. For this reason, the present invention permits the operator to set or adjust the tool to enable it to apply only the deisred or predetermined test or "go" force to the workpiece. If the workpiece fails before the full force can be applied, it is "no-go."

In order to effectuate the "go," "no-go" test of the workpiece, there is provided, as an integral part of the hand grip 40, an adjustable hand grip knob section 72. The handle or knob section 72 has a spring actuator 74 that extends upward into the confines of the hand grip section 40. The spring actuator portion 74 and the adjacent interior surface of the hand grip section 40 are provided with mating threaded surfaces 76. Hence, rotation of the section 72 relative to its companion section 40 of the handle permits relative deeper penetration or withdrawal of the spring actuator 74 from the section 40 thereby varying the compression of the spring 42 and the force with which the same will apply against the movable plunger 44. In order to enable an accurate setting of the force transmitting and releasing structure 41, the top of the section 72 is provided with indices that are adapted to cooperate with indices on the adjacent face of the hand grip section 40 as shown in FIG. 1 to enable an accurate and minute micrometer type adjustment of the spring 42.

In operation, with the workpiece 68–70 engaged at spaced points along its length by the engaging structures 21 and 58, it is now possible to apply a linear force in opposite directions at the engaged points on the workpiece. This force is applied by way of the force transmitting structure 41 that is located or positioned axially along the handle sections 40 and 72 and transverse to the direction of the linear force applied to the workpiece. Thus, as the hand grips 12 and 40 are moved toward each other about the pivot 20 in the direction of the arrows A (FIG. 1), resulting from the application of finger pressure about the finger grip 12 and palm pressure of the hand to grip section 40, they simulate a plier-type motion.

The force transmitted by way of the handle 40–72 to the workpiece engaging structure 58, to the workpiece 68–70, is accomplished through the force transmitting structure 41. During the application of a testing force to the workpiece, the lever or ball 48 is retained between the seat 50 of the hinge element 52 and the contoured force transmitting seat 46 of the plunger 44. However, when the force applied to the workpiece exceeds that of the force for which the spring 42 acting between the spring actuator 74 and the plunger 44 has been preset by the adjustment of the knob 72, the lever 48 is caused to ride up and out of the contoured seat 46 and into an adjacent narrowed non-force transmitting guide release groove 78 (see FIG. 6).

As the lever 48 pops or rides out of its seat 46 in the plunger 44 and into the release groove 78, it emits an audible pop or sound. This is immediately followed by a tap made by the hinge element 52 as it strikes against the interior surface of the pivot arm 18 as shown in FIG. 5. When this happens, the new position (FIG. 5) of the hinge element 52 is such as to prevent the application of an additional linear force to the workpiece. The handle falls limp in the hand of the operator. However, immediately upon the release of hand squeezing pressure between the finger grip 12 and the hand grip 40, the lever ball rolls down the groove 78 and back into its force transmitting contoured seat 46 to its operative position as shown in FIG. 4 thereby permitting the tool to be used once again.

Thus, it will be recognized that the pivoted movement of the handle and its force transmitting structure 41, related transversely to the workpiece, is transformed to a linearly directed force to the workpiece. However, when the applied linear force exceeds the predetermined setting of the spring 42, the force transmitting structure automatically becomes inoperative. Moreover, it emits a sound that is perceptible to the audible senses as well as creating a striking vibration in the tool that is perceptible to the tactile senses. When his occurs, the tool is incapable of applying additional testing forces to the workpiece. By virute of its manner of operation, the testing tool 10 has the ability to perform a "go" or "no-go" test. Hence, when the workpiece is capable of withstanding the test, it is said to "go," when it fails the test, it is said to be "no-go."

Referring now to FIG. 7, there is disclosed the same testing tool 10 as described with respect to FIGS. 1 to 6 inclusive. However, in the embodiment shown in FIG. 7, the workpiece engaging structure 21 has been removed and a vise-like workpiece engaging structure generally identified by the numeral 58a has been substituted in its place. The vise-like structure 58a of FIG. 7 is similar in detail to that of the structure 58 previously described and is adapted to be employed when a workpiece of the type 68a–70a is adapted to be tested.

In such situation, the workpiece 68a–70a must be engaged at two distant points along the length thereof by a positive vise-like engaging structure as shown. Because the structure 58a is so similar to that of 58 previously described, like details are similarly numbered and a duplicate description omitted. However, the structure 58a includes a body 22a that has a locating pin 34a adapted to seat in the groove 32 at the top of the laterally extending pivot arm 14 to prevent rotation of the vise structure 58a relative to the arm 14. The body 22a is provided with a spring pressed protruding ball detent 28a that is adapted to seat in and cooperatively engage with the aperture 26 defined in the arm 14.

Referring now to FIG. 8, there is shown a modified form of workpiece engaging structure 21b that includes a body 22b. The similarity of the structure 21b to that of the workpiece engaging structure 21 of FIGS. 1 and 3 should be readily apparent. Its use, however, enables it to accommodate workpieces of the type shown in FIG. 8. The workpiece in FIG. 8 comprises a pin type electrical connector 68b that is fixed to a wire or other workpiece element 70b. The body 22b is provided with a reception slot 23b defined radially inward from the face thereof. The slot 23b is adapted to receive the pin of the connector element 68b. The pin connector 68b is retained in the slot 23b by the threaded engagement of the lock screw 66b. When the workpiece engaging structure 21b is utilized with the tool 10, it too is provided with a locating pin 34b that is adapted to coincide with and seat in the groove 32 of the arm 14. The structure 21b is retained in engagement with the arm 14 by virtue of its ball detent 28b projecting outward for mating cooperating engagement with the aperture 26 of the arm 14.

The embodiment of the testing tool shown in FIG. 9 is generally identified by the numeral 100. The detailed elements thereof are numbered in the 100 series. The tens numbers of such identifying numerals correspond, wherever possible, to like numbered elements and details of structure previously described with respect to the testing tool 10. The testing tool 100 comprises a bench type stand 112 that will enable the tool to accommodate large workpieces and enable the application of testing forces much in excess of those capable of being applied to a workpiece by the embodiment 10 of the testing tool previously described.

The bench type stand 112 includes a U-shaped support 114 on which a pivotable member 118 is pivotally mounted by the pin 120. Included within the pivotable member 118 is a hand grip section 140 that is connected to an adjustable movable hand grip section 172. The relationship of the member 118 and its hand grip sections 140 and 172 to like elements 18, 40 and 72 respectively of the testing tool 10 should be readily apparent. Included within the hand section 140 and the pivotable member 118 is the force transmitting and releasing structure 41 previously described with respect to the plier-type testing tool 10.

In FIG. 9, the hinge element 52 and surrounding rubber ferrule 56 of the force transmitting structure 41, are illustrated. The hinge element 52 is pivotally connected in the interior of the pivotable member 118 by the hinge pin 154. Its opposite end is immovably mounted by the pin connection 162 in the workpiece engaging structure generally identified by the numeral 158 in the same manner as described with respect to the plier-type testing tool 10. Thus, the hinge element 52 pivots within the pivotable member 118 and is positively connected to the body 160 of the workpiece engaging structure 158 at the pin connection 162 for operation in the same manner as was described with respect to the tool 10.

The workpiece engaging structure 158 includes the body member 160 that is slotted radially inward at 123. A threaded pin 180 extends axially along and for a portion of the length of the body member for threaded adjustment relative thereto for engagement with a workpiece positioned in the workpiece receiving slot 123. Manual adjustment of the screw 180 is afforded by the knob 182.

The stand 112 is adapted to be secured to any convenient bench or surface by screwing or otherwise securing the same thereto at the openings 184. An adjustment guide or slide 186 is provided along the vertical face of the stand and along which a vise-like workpiece engaging structure 121 is adapted to be adjusted. The structure 121 is similar in detail and operation to the workpiece engaging structure 58 of the testing tool 10. It comprises a body member 188 that is grooved to ride along the vertical length of the guide or slide 186. A pair of set screws 190 are adapted to engage an adjacent face of the slide 186 to retain the workpiece engaging structure 121 in any desired vertical position of adjustment along the face of the stand 112.

A threaded screw 166, having a manually engageable knob 167, is adapted to be threadably rotated in the body member 188 to adjustably move a vise element 164 toward and away from its mating vise element 165. A work engaging insert 169 is provided when the workpiece to be tested is relatively small, thereby eliminating the requirement for a longer length of adjustment or movement of the vise element 164. The slot 123 and the location of the work engaging surfaces of the vise element 164 are linearly aligned with each other so that the test forces applied to the workpiece 168 and 170 will be in alignment.

The operation of the embodiment of FIG. 9 is the same as that for the testing tool 10 previously described. The adjustment knob section 172 is rotated relative to its section 140 to pre-stress the spring 42 of the force transmitted and releasing structure 41 enclosed within the handle section and the pivotable member 118. After the workpiece 168–170 is engaged by the workpiece engaging structures 158 and 121 respectively at linearly spaced points therealong, the operator need merely apply a downward force to the handle in the direction of the arrow A as shown in FIG. 9.

This pivotal force is transmitted undiminished along the axially related parts of the force transmitting structure 41 to the body member 160 of the workpiece engaging structure 158. Thereafter, the pivotal force is transformed to a linear force applied along the length of the workpiece 168–170. As in the tool 10, it is unnecessary for the operator to provide his full attention to the workpiece. If the workpiece is capable of sustaining or withstanding the predetermined force for which the spring 42 had been preset, the lever ball 48 will pop out of its seat 46 and into its release groove 78, thereby releasing the further transmission of force from the handle 172–140 to the workpiece.

Substantially instantaneously with this sudden release of resistance which can be felt in the handle, the popping of the ball out of its seat 46 will provide the operator with an audible sound. Almost simultaneously, the hinge element 52 strikes against the interior of the pivotable member 118 causing a vibration in the handle sections 140 and 172 that can be felt by the operator. When this occurs, the operator immediately knows that the workpiece has passed the test. As soon as downward pressure in the direction of the arrow A against the handle sections 172 and 140 is removed, the lever 48 is caused to roll down the groove 78 back into its seat 46, thereby conditioning it as shown in FIG. 4 for another testing operation.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. A device for testing a workpiece comprising a pair of relatively spaced engaging means movable relative to each other and adapted to engage a workpiece to apply a linear force thereto, means movable to cause said engaging means to move relative to each other, force transmitting means between said movable means and one of said engaging means to transmit the force of movement of said movable means undiminished directly to said one engaging means to cause the same to apply a linear force to the workpiece, said force transmitting means being operable to release the transmission of the force of movement of said movable means when the linear force applied to the workpiece exceeds a predetermined force and to provide an indication perceptible to the audible and tactile senses of the application to the workpiece of a force in excess of the predetermined force, said movable means being a manually actuatable handle mounted for pivoted movement, a frame on which said handle is pivotally mounted, and said other engaging means being mounted on said frame for linear movement relative thereto.

2. A device for testing a workpiece comprising a pair of relatively spaced engaging means movable relative to each other and adapted to engage a workpiece to apply a linear force thereto, means movable to cause said engaging means to move relative to each other, force transmitting means between said movable means and one of said engaging means to transmit the force of movement of said movable means undiminished directly to said one engaging means to cause the same to apply a linear force to the workpiece, said force transmitting means being operable to release the transmission of the force of movement of said movable means when the linear force applied to the workpiece exceeds a predetermined force and to provide an indication perceptible to the audible and tactile senses of the application to the workpiece of a force in excess of the predetermined force, said movable means being a manually actuatable handle mounted for pivoted movement, a second handle pivoted to said first mentioned handle for pivotal movement relative thereto and connected with said other engaging means.

3. A device for testing a workpiece comprising a plier-like tool having a pair of handles each pivoted to the other for relative movement, gripping means to grip the workpiece at spaced points therealong and connected for movement with each one of said handles to apply a linear force on the workpiece between said gripping means in response to the pivoted relative movement of said handles, and one of said handles including force transmitting means adjustable to transmit a predetermined force of pivotal movement of its handle undiminished and directly to its respective gripping means and operable to release the transmission of the force of pivotal movement of its handle when the same exceeds said predetermined force.

4. A device for testing a workpiece as in claim 3, at least one of said griping means including a pair of vise-like jaws and means adjustable to cause a relative movement between said jaws to releasably grip the workpiece therebetween.

5. A device for testing a workpiece as in claim 3, at least one of said gripping means including a body having a detent engageable with its respective handle, and a pin projecting upward from said body.

6. A device for testing a workpiece as in claim 3, at least one of said gripping means including a body having a detent engageable with its respective handle, a workpiece receiving slot defined in said body, and screw means threaded in said body to extend into said slot to grip the workpiece therein.

7. A device for testing a workpiece comprising a stand, a handle mounted for pivotal movement on said stand, first gripping means on said handle, force transmitting means connected with said handle and said first gripping means and being adjustable to transmit a predetermined force of pivotal movement undiminished and directly from said handle to said first gripping means, second gripping means on said stand, and adjustable slide means on said stand to adjustably slide said second gripping means relative to said first gripping means.

8. A device for testing a workpiece as in claim 7, said force transmitting means being operable to release the transmission of force of pivotal movement from said handle to said first gripping means when the same exceeds said predetermined force.

9. A device for testing a workpiece as in claim 7, said second gripping means including a pair of vise-like jaws, and means adjustable to cause said jaws to move relative to each other to releasably grip the workpiece therebetween.

References Cited by the Examiner
UNITED STATES PATENTS

| | | | |
|---|---|---|---|
| 1,723,389 | 8/1929 | Thiel. | |
| 2,400,920 | 5/1946 | Cummings | 73—95 |
| 2,729,134 | 1/1956 | Stanton et al. | 81—52.4 X |
| 2,759,357 | 8/1956 | Bos et al. | 73—141 |
| 2,782,635 | 2/1957 | Knight | 73—95 |
| 2,849,879 | 9/1958 | Schiller | 73—141 |
| 2,881,636 | 4/1959 | Palmleaf | 81—52.4 X |

RICHARD C. QUEISSER, *Primary Examiner.*

C. A. RUEHL, *Assistant Examiner.*